Oct. 29, 1929.  L. ROUANET  1,733,673
ROLLING MEMBER BEARING WITH TWO-PIECE WELDED CAGE
Filed March 2, 1927
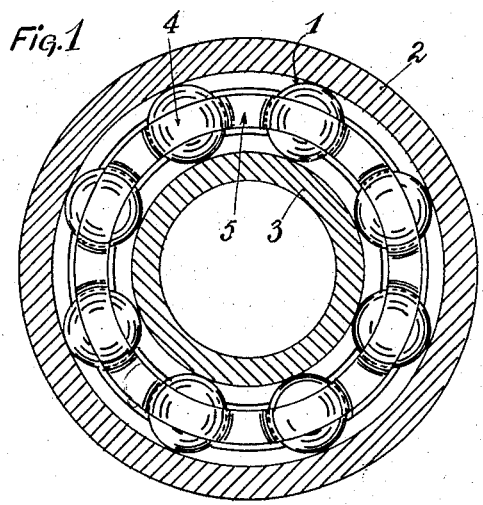
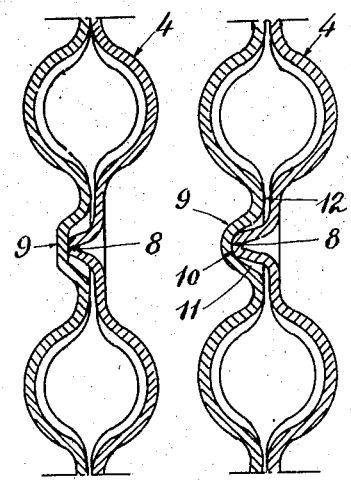
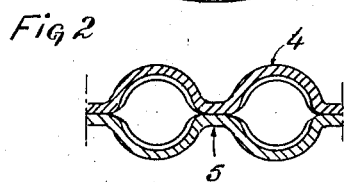
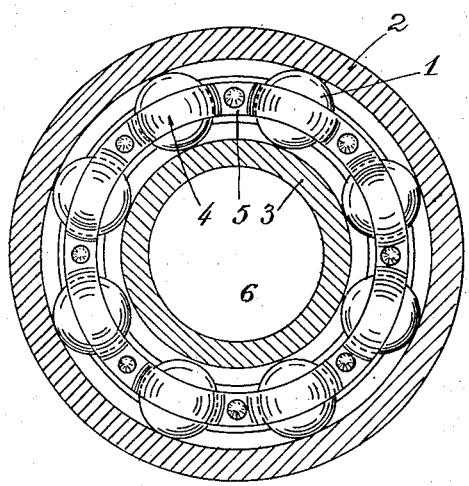
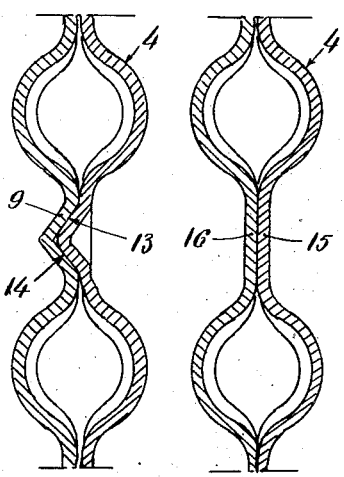
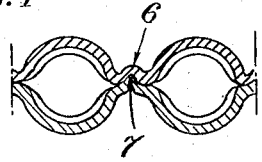
L. Rouanet
INVENTOR
By: Marks & Clark
Attys.

Patented Oct. 29, 1929

1,733,673

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY

ROLLING-MEMBER BEARING WITH TWO-PIECE WELDED CAGE

Application filed March 2, 1927, Serial No. 172,151, and in France March 10, 1926.

The present invention is for improvements in ball or other rolling member bearings having cages of the type comprising two symmetrically joined parts and each of which has hemispherical or semi-cylindrical notches for holding the rolling members, as well as flat portions formed between two consecutive notches.

In such a type of bearing the assembly of the said two parts of the cage is usually obtained either by a riveting process, which riveting process necessitates many operations, reduces the strength of the cage and only enables a limited number of rolling members to be used; or by autogenous welding, in which case the necessary smelting for assembly may conveniently be obtained by means of the electric current, this process enabling the number of balls or other rolling members in the bearing to be increased.

When assembling large numbers of bearings with cages of this type, using the autogenous welding process, it is very difficult to make sure that each bearing is properly assembled.

After the autogenous welding operation, each of the bearings must be very carefully inspected, to ascertain whether or not—either owing to a default operation of the welding machine or by the operator's carelessness—several of the spot welds on the cage have not been omitted or poorly executed which would greatly affect the value of the bearing.

The improvements, object of the invention are characterized in that each of the constituent parts of the cage are provided, before the welding process, that is before inserting the said two parts between the races and on the row of rolling members more or less uniformly distributed between the two said races, with conjugated or corresponding bosses liable to disappear during the welding operation and which will not disappear unless the weld has effectively been made.

The aforesaid described features form by themselves a sure controlling means or system which renders any other subsequent inspection unnecessary.

If the bosses are flattened, the weld is surely correctly made; if to the contrary the bosses remain, the weld has not or has been badly made.

The invention will moreover be more clearly understood with reference to the accompanying drawing given as example, in which:

Fig. 1 is a side elevation of an ordinary type of ball bearing, having a two piece cage, the two parts of which are joined together by a welding operation; in this figure the races are shown in section.

Fig. 2 is a partial sectional development of the cage showing the spot welds.

Fig. 3 is a view, similar to Fig. 1, of a ball bearing having a cage according to the invention, the two parts of the cage not being welded together.

Fig. 4 is a partial sectional development of the cage illustrated in Fig. 3, also before the welding operation.

Fig. 5 is a partial sectional development, drawn at a larger scale, of a cage according to the invention, before the welding operation.

Figs. 6 and 7 are views similar to that of Fig. 5, showing other alternatives.

Fig. 8 shows the cages according to Figs. 3 to 7 inclusive, after the welds have effectively been made.

Figs. 1 and 2 show a ball bearing of the usual type, in which the balls 1 are enclosed between two races 2 and 3, these balls being spaced by means of a cage or retainer comprising two symmetrical parts each provided with notches 4 for holding the balls, and flat regions 5 between the said notches. The two parts of the cage are usually retained together either by rivets passing through the adjacent flat regions 5 or by welding together the said adjacent flat regions. When the autogenous welding process is used, it is difficult to ascertain whether or not each weld is correctly executed, because the outside appearance of the cage is the same before and after the welding operation.

In the bearing illustrated Figs. 3 and 4, the two parts of the cage are also provided with notches 4 for holding the balls, but the flat regions between the said notches are respectively provided with bosses 6 and 7 having a corresponding fit. By using suitably shaped electrodes, it will be possible to melt the metal of the said regions, thus producing the weld, and to press back the bosses 6 and 7 intentionally formed in the parts, so as to cause them to completely disappear. Where the bosses are flattened the metal has effectively melted and consequently a close and perfect weld has been made between the two members to be assembled. Therefore, no badly made or omitted weld can pass unnoticed, since the bosses serve as witnesses on the satisfactory execution of the operation.

The contacting surfaces of the bosses can be shaped in various forms. Thus, in the example shown in Fig. 5, the male boss 8 is not centered in the female boss 9 but can take up different positions on the flat central part of the said female boss, so that the centering of the two rings forming the cage will be effected by the balls.

In the example shown in Fig. 6, the male boss 8 is centered in the female boss 9, so that the bosses and not the balls center the rings forming cage. This latter arrangement is to be recommended particularly for careful and precise construction, for its enables the two halves of the cage to be centered independently of the balls.

It will be noted that both in the example shown in Fig. 5 and in the example shown in Fig. 6, the bosses 8 and 9 contact only at a single point 10, leaving between them an annular space 11 and a certain clearance 12 between the two flat portions of the cage on each side of the bosses. This single point of contact offers a particularly high resistance to the passage of the electric current; therefore a considerable heating of the metal, and subsequently a smelting of the latter and consequently an immediate and sure smelting of the metal which starts the weld and facilitates the complete welding are obtained.

As soon as the metal starts to melt at the point of contact between the two bosses, the molten metal runs into the annular space 11 between the bosses 8 and 9 where it collects, thus increasing the effective surface of the weld, without overflowing or running outside.

In the example shown in Fig. 7, the two bosses instead of meeting at the point, make contact with each other on two small equally inclined conical surfaces 13 and 14 provided on the bosses 8 and 9 respectively.

Whatever may be the shape of the bosses before welding, all the cages have the appearance of Fig. 8 after the welding operation, the bosses having been pressed down so as to again form flat regions 15 and 16 (Fig. 8) between two consecutive notches 4.

Many detail modifications can be made in the above described examples, and obviously said modifications come within the scope of the invention if they are based on the principles set forth.

Claims:

1. A bearing provided with rolling members having a cage composed of two parts assembled by electrical welding, characterized in that uninterrupted embossed parts are pressed in the portions located between the holding notches for the rolling members of each of the two parts of the cage before the latter are put into position on the rolling members, the embossed parts of one part entering and accommodating the inner space of the embossed parts of the other part and said embossed parts being destined to be pressed down under the pressure of the electrodes during the welding operation, so as to form flat regions between the consecutive recesses for the rolling members.

2. A bearing provided with other rolling members having a cage composed of two parts assembled by electrical welding, characterized in that laterally projecting embossed parts are initially pressed in each of the parts of the cage on the portions located between the notches for the rolling members, each embossed part on one part entering the inner space of an opposite embossed part of the other part and the said embossed parts being adapted to be flattened together under the heat and pressure of the welding operation to form plane regions between the consecutive notches.

3. A bearing according to claim 1, having a two part cage assembled by electrical welding, each part of the cage provided with laterally extending embossed parts pressed in the regions between the notches for the rolling members, the embossed parts of one part entering the inner space of the corresponding embossed parts of the other part and the embossed parts in one part contacting the embossed parts in the other part at only one point, whereby an increasing electrical resistance is obtained at this point to start the smelting and the complete welding of the two parts of the cage.

4. A bearing according to claim 1, having a two part cage assembled by electrical welding, each part of the cage provided with laterally extending embossed parts conjugated by pairs, one embossed part in each pair entering the inner space of the corresponding embossed part of the pair and the embossed parts in each pair contacting each other at only one point, the embossed parts being so shaped that the two parts of the cage are centered in the bearing by means of the rolling members.

5. A bearing according to claim 1, having a two part cage assembled by electrical welding, each part of the cage provided with laterally extending embossed parts conjugated by pairs, one embossed part in each pair entering the inner space of the corresponding embossed part of the pair and the embossed parts in each pair contacting each other but at a free number of points, whereby an increasing electrical resistance is obtained at these points to start the smelting and the complete welding of the two parts of the cage.

6. A bearing according to claim 1, having a two part cage assembled by electrical welding each part of the cage provided with laterally extending embossed parts conjugated by pairs, one embossed part in each pair entering the inner space of the corresponding embossed part of the pair and the embossed parts in each pair being so shaped that the two parts of the cage are centered in the bearing by means of the said embossed parts.

In testimony whereof I affix my signature.

LOUIS ROUANET.